United States Patent [19]

Bos

[11] Patent Number: 5,410,422

[45] Date of Patent: Apr. 25, 1995

[54] GRAY SCALE LIQUID CRYSTAL DISPLAY HAVING A WIDE VIEWING ANGLE

[75] Inventor: Philip J. Bos, Beaverton, Oreg.

[73] Assignee: Tektronix, Inc., Wilsonville, Oreg.

[21] Appl. No.: 25,486

[22] Filed: Mar. 3, 1993

[51] Int. Cl.$^6$ .................... G02F 1/1335; G02F 1/137
[52] U.S. Cl. ...................................... 359/73; 359/75; 359/99; 359/63; 359/93
[58] Field of Search ............... 359/63, 73, 75, 77, 359/93, 78, 99, 103, 494; 345/89

[56] References Cited

U.S. PATENT DOCUMENTS

| | | | |
|---|---|---|---|
| 4,385,806 | 5/1983 | Fergason | 359/73 |
| 4,583,825 | 4/1986 | Buzak | 350/335 |
| 4,889,412 | 12/1989 | Clerc et al. | 359/65 |
| 5,039,185 | 8/1991 | Uchida et al. | 359/93 |
| 5,179,456 | 1/1993 | Aizawa et al. | 359/73 |
| 5,196,953 | 3/1993 | Yeh et al. | 359/73 |
| 5,231,522 | 7/1993 | Sumiyoshi | 359/73 |
| 5,243,451 | 9/1993 | Kanemoto et al. | 359/73 |
| 5,298,199 | 3/1994 | Hirose et al. | 359/73 |

FOREIGN PATENT DOCUMENTS 2595156  2/1986  France ..................... G09F 9/35

OTHER PUBLICATIONS

"Multi-Domain Homeotropic LCDs with Symmetrical Angular Optical Performances," H. L. Ong, SID Digest, 1992, pp. 405–408.
"Two-Domain Twisted Nematic and Tilted Homeotropic Liquid Crystal Displays for Active Matrix Applications," K. H. Yang, Proceedings of the International Display Research Conference, IEEE, Aug. 1991, pp. 68–72.
"Full-Cone Wide-Viewing-Angle Multicolor CSH-LCD," Yamamoto et al., SID Digest, 1991, pp. 762–765.
"Vertically Aligned Liquid-Crystal Displays," J. F. Clerc, SID Digest, 1991, pp. 758–761.
"The pi-Cell: A Fast Liquid-Crystal Optical-Switching Device," P. J. Bos and K. R. Koehler/Beran, Molecular Crystals and Liquid Crystals, Gordon and Breach, Science Publishers, Inc., 1984, vol. 113, pp. 329, 332–337.
"44.3:Film-Compensated Parallel-Aligned Cells for High-Speed LCDs", S-T, Wu, A. M. Lackner, Hughes Research Lab., Malibu, Calif., SID 94 Digest.
"44.3:Improvement of Gray-Scale Performance of Optically Compensated Birefringence (OCB) Display Mode for AMLCDs", C-L. Kuo, et al., Tohoku University, Sendai, Japan, SID 94 Digest.
"S7-4 New Normally White Negative Birefringence Film Compensated Twisted Nematic LCDs with Largest Viewing Angle Performance", H. L. Ong, IBM T. J. Watson Res. Ctr., Yorktown Heights, N.Y.

Primary Examiner—William L. Sikes
Assistant Examiner—Tai V. Duong
Attorney, Agent, or Firm—John D. Winkelman; Paul S. Angello; Richard B. Preiss

[57] ABSTRACT

A gray scale LCD cell device (116) combines a liquid crystal cell (80) having a symmetrical director field (82, 82') with a negative birefringence compensator plate (110) and interposes them between a pair of linear polarizers (112, 114). The symmetrical director field produces a symmetrical but nonuniform gray scale or color viewing circle curve (100) from the liquid crystal cell. The negative birefringence plate restores the gray scale or color viewing angle uniformity. When graphed on a polar plot, the measured light transmission percentage curves (120, 122, 124) characterizing the LCD are substantially concentric circles surrounding the optical axis (18) for all azimuthal angles (28) and viewing angles (24) up to 30 degrees. Adding colored filters (152) to a color cell triad (150) provides a basis for a multi-color display having uniformly perceived colors over a wide range of azimuthal and viewing angles.

14 Claims, 11 Drawing Sheets

30° OFF AXIS
INTENSITY = 0 TO 8%

ON AXIS
INTENSITY = 0

30° OFF AXIS
INTENSITY = 2% TO 93%

ON AXIS
INTENSITY = 36%

30° OFF AXIS
INTENSITY=0 TO 20%

ON AXIS
INTENSITY=0%

30° OFF AXIS
INTENSITY=20 TO 82%

ON AXIS
INTENSITY=50%

GRAY SCALE LIQUID CRYSTAL DISPLAY HAVING A WIDE VIEWING ANGLE

Technical Field

This invention relates to liquid crystal displays ("LCDs") and more particularly to an apparatus and a method for providing a gray scale LCD in which intermediate transmission levels are uniformly perceived across a wide viewing angle.

BACKGROUND OF THE INVENTION

There are previously known apparatus and methods for improving the viewing angle of a "bi-level" LCD. An LCD is referred to as bi-level if it is switchable between a substantially light-transmissive state and a substantially opaque state, whereas a "gray scale" LCD has additional intermediate light transmissive states. Bi-level LCDs are commonly used in portable computer displays, whereas the poor viewing angle of gray scale LCDs has limited their use to small-screen devices such as portable television receivers. Before gray scale LCDs can be effectively used in large-screen television and color computer applications, viewing angle improvements are needed.

A clearer understanding of viewing angle factors follows with reference to FIG. 1. An LCD 10 having a front surface 12 and a rear surface 14 is illuminated from behind rear surface 14 by a light source 16. LCD 10 has a viewing axis 18 that is shown as a dashed line normal to the center of front surface 12 of LCD 10. An observer's eye located on viewing axis 18 at a position 20 views LCD 10 "on axis." If the observer's eye moves off axis to a position 22, LCD 10 is viewed at an off axis viewing angle 24 with respect to viewing axis 18. LCD 10 can be viewed with a constant viewing angle 24 anywhere around a viewing circle 26. Positions around viewing circle 26 are at an azimuthal angle 28 relative to a reference point 30 on viewing circle 26. As the observer views LCD 10 from various viewing and azimuthal angles, the perceived light may change in intensity, contrast ratio, or color. The degree of change may not be acceptable depending on the optical transmission characteristics of LCD 10 and the application.

FIGS. 2A, 2B, and 2C show, for a prior art twisted nematic LCD, light transmission percentage variation around viewing circle 26 for on-axis and 30 degree viewing angles and respective 0, 36, and 100 percent on-axis transmission levels. An ideal LCD would have light transmission percentage curves shown as concentric circles surrounding viewing axis 18 for all viewing angles. FIGS. 2A and 2C show respective near ideal light transmission curves 32 and 34 representing respective 0 and 100 percent (bi-level) transmission levels. However, FIG. 2B shows that for a 36 percent on-axis light transmission circle 36, light transmission at a 30 degree viewing angle degrades to an asymmetrical light transmission curve 38 varying from 2 to 93 percent transmission around viewing circle 26. Therefore, an intended 36 percent transmission level can be perceived by an observer as varying anywhere between "black" and "white," a clearly unacceptable variation.

FIG. 3 shows a prior art twisted nematic cell 40 of the type having the light transmission characteristics shown in FIGS. 2A, 2B, and 2C. The variation of off-axis light transmission represented in FIG. 2B is caused by asymmetry in a director field 41 of twisted nematic cell 40. Director field 41 is disposed between a pair of parallel electrodes 42A and 42B and includes elongated liquid crystal directors 43A through 43G (shown as lines), each oriented as indicated by the direction of the lines.

Director field symmetry or asymmetry is ascertained by assuming that twisted nematic cell 40 is bisected by an imaginary plane of symmetry 44 (shown in dashed lines) that is parallel to and equidistant from parallel electrodes 42A and 42B. For director field 41 to be symmetrical, directors disposed between electrode 42A and plane of symmetry 44 should be positioned and oriented with mirror-image symmetry relative to corresponding directors disposed between electrode 42B and plane of symmetry 44. Mirror-image symmetry exists if the half of director field 41 disposed between electrode 42B and plane of symmetry 44 can be inverted and superimposed on the half of director field 41 disposed between electrode 42A and plane of symmetry 44 such that the corresponding directors in both halves are spatially coincident. Directors 43A, 43D, and 43G lie substantially in respective planes 42A, 44, and 42B and are angularly twisted relative to each other. Clearly, mirror-image symmetry is not possible, and director field 41 is, therefore, asymmetrical.

Tunable birefringence type devices in which the directors are generally not twisted have also been used in LCD applications. Rather, the directors are generally co-planar with an imaginary cross-sectional plane oriented perpendicular to the cell electrodes.

FIG. 4 is an enlarged cross-sectional view of such a prior art tunable birefringence LCD cell 60 having a generally co-planar asymmetrical director field 62 disposed between a pair of transparent electrodes 64. A director in contact with a transparent electrode 64 is referred to as a surface contacting director 66. Any other director is referred to as a bulk director 68. The degree of birefringence, and therefore the light transmission, at any point in cell 60 is a function of the angle between a light ray and adjacent directors. Minimum birefringence occurs when the light ray propagates parallel to adjacent directors, and maximum birefringence occurs when the light ray propagates perpendicular to adjacent directors. The effective birefringence and light transmission of cell 60 is, therefore, a function of the average angle a light ray makes relative to all directors passed while traversing cell 60.

For example, electric potentials are applied to transparent electrodes 64 to hold director field 62 in an electric field of sufficient strength to provide an intermediate light transmission level through cell 60. A light ray 70 traversing cell 60 at an angle 72 has a minimum effective birefringence because the propagation direction of light ray 70 is somewhat parallel to a majority of directors 66 and 68. However, a light ray 74 traversing cell 60 at opposite angle 72 has a greater effective birefringence because the propagation direction of light ray 74 is somewhat nonparallel to a majority of directors 66 and 68.

The light transmissivity T (ranging from 0.0 to 1.0) of a tunable birefringence cell positioned between a pair of crossed linear polarizers is calculated from the equation:

$$T = \sin^2(\pi \Delta n' d / \lambda),$$

where the imaginary plane containing the co-planar directors is at a 45 degree angle relative to the polarization axes of the linear polarizers, $\lambda$ is the wavelength of the transmitted light, d is a distance 76 between electrodes 64, and Δn' is the effective birefringence of the cell.

FIG. 5 shows, for tunable birefringence cell 60 of FIG. 4, a light transmission variation curve 78 around viewing circle 26 for a 30 degree viewing angle and a 50 percent on-axis transmission level. The effective birefringence variation in cell 60 as a function of viewing and azimuthal angle (which are also the light ray propagation angles) causes the unacceptable variations in cell 60 light transmission.

Referring again to FIG. 1, a viewing angle of 30 degrees is not unusual. For example, if LCD 10 has a diagonal dimension 48 of 53 centimeters (21 inches), the eye of the observer at position 20, a distance 50 of 46 centimeters (18 inches) from LCD 10, views a corner 52 of LCD 10 at an angle 54 of about 30 degrees. Therefore, under optimum computer viewing conditions it is not possible to view an entire 21-inch LCD without some areas of the display being at a 30 degree viewing angle. Of course, it is unlikely that the observer will always be centered on viewing axis 18 of LCD 10, and the viewing angle is even greater for certain individuals in a group of observers. This condition has hindered the use of color and gray scale LCDs in large-screen computer and television applications. Because the use of color and gray scale LCDs has been limited to small hand-held devices, many observers have not seen the gray scale viewing angle problem.

A "pixel" is the smallest addressable light transmission cell on an LCD, with a typical LCD having thousands of addressable pixels. Each pixel individually exhibits the same viewing angle characteristics exhibited by the entire LCD. In an LCD having multiple addressable pixels, each pixel can be thought of as an individual LCD cell. However, some LCD applications use a single large cell to cover an entire display surface. Therefore, LCDs can have as few as one cell or as many as thousands of cells. This invention applies equally to all such LCDs.

Prior workers have attempted to solve the gray scale LCD viewing angle problem by using multi-domain pixels in which the directors in one domain of the pixel are rotated 180 degrees from the directors in the other domain. The effective birefringence undergone by angled light rays is thereby averaged to improve the viewing angle characteristics of such an LCD. "Two-Domain Twisted Nematic and Tilted Homeotropic Liquid Crystal Displays for Active Matrix Applications," K. H. Yang, Proceedings of the International Display Research Conference, IEEE, August 1991, pp. 68–72, describes a twisted nematic bi-domain pixel display with improved viewing angle characteristics in the horizontal viewing axis.

Other approaches to aligning directors with light rays are described in "Vertically Aligned Liquid-Crystal Displays," J. C. Clerc, SID Digest, 1991, pp. 758–761 ("Clerc"), and "Multi-Domain Homeotropic LCDs with Symmetrical Angular Optical Performances," H. L. Ong, SID Digest, 1992, pp. 405–408 ("Ong"). Both papers describe vertically aligned nematic ("VAN") cells (homeotropically aligned liquid crystal directors that have negative dielectric anisotropy) to improve viewing angle characteristics. Such cells have their surface contacting directors aligned substantially parallel to the viewing axis of the cell. However, the director fields in such cells are asymmetrical, and Clerc and Ong state that multi-domain pixels are required to achieve an acceptable viewing angle for such cells. Moreover, multi-domain pixel LCDs are generally costly, are difficult to manufacture, and have a light scattering wall between the pixel domains that reduces the contrast ratio of the cell.

Ong also describes the use of a negative birefringence compensating plate to improve bi-domain VAN LCD viewing angle characteristics. French Pat. No. 2 595 156 of Clerc et al. for "A Negative Birefringence Controlling Plate for use with Liquid Crystal Cells," published Sep. 4, 1987, describes methods for making such a plate. However, Ong shows that using a negative birefringence compensating plate does not dramatically improve LCD viewing angle characteristics and reveals a viewability compromise.

FIGS. 6A and 6B (reproduced from Ong) show optical transmission respectively with and without a negative birefringence compensator plate, graphed as a function of horizontal-axis viewing angle for each of four gray transmission levels of the bi-domain VAN LCD. For the uncompensated cell of FIG. 6A, the 4.3 volt transmission curve varies from 35 to 46 percent (a 31 percent change) over a viewing angle variation of 0 to 30 degrees, whereas in the compensated cell of FIG. 6B, the 4.3 volt transmission curve varies from 66 to 49 percent (a 25 percent change). However, for the uncompensated cell of FIG. 6A, the 10 volt transmission curve varies from 95 to 90 percent (a 5 percent change) over a viewing angle variation of 0 to 30 degrees, whereas in the compensated cell of FIG. 6B, the 10 volt transmission curve varies from 95 to 80 percent (a 15 percent change). The viewing angle is, therefore, improved by the negative birefringence compensator plate for transmission levels below 50 percent but is compromised for transmission levels above 50 percent.

Another type of prior art tunable birefringence cell is described in "The pi-Cell: A Fast Liquid-Crystal Optical Switching Device," by P. J. Bos and K. R. Koehler/Beran, Molecular Crystals and Liquid Crystals, 1984, Vol. 113, pp. 329–339 ("Bos and Koehler/Beran"), which describes the use of a symmetrical director field for achieving a wide viewing angle for a fast switching bi-level LCD. FIG. 7 shows an enlarged cross-sectional view of such a symmetrical LCD cell 80 having optically "self-compensating" director fields 82 and 82' symmetrically disposed about a cell centerline 83 located midway between a parallel pair of transparent electrodes 84 and 84'. Director fields 82 and 82' include respective surface contacting directors 86 and 86' as well as respective bulk directors 88 and 88'.

FIGS. 8A, 8B, and 8C show, for symmetrical LCD cell 80, light transmission percentage variation around viewing circle 26 for on-axis and 30 degree viewing angles and respective 0, 50, and 100 percent on-axis transmission levels. FIGS. 8A and 8B show acceptable bi-level transmission variations around respective 0 and 100 percent viewing circle curves 90 and 92. FIG. 8B shows that a 50 percent viewing circle curve 94 is more symmetrical than 36 percent viewing circle curve 38 (FIG. 2B) of the prior art twisted nematic cell. However, the viewing angle transmission variation of 20 to 82 percent is still unacceptable. In this regard the transmission viewing circle curves are similar to twisted nematic and many other cell types which have acceptable bi-level transmission viewing angles but have unacceptable viewing angles for intermediate transmission levels.

What is needed, therefore, is a low-cost, easily manufactured, color and gray scale LCD having wide and uniform viewing angle characteristic and a high contrast ratio. Such an LCD would be useful in large-screen color television displays.

SUMMARY OF THE INVENTION

An object of this invention is, therefore, to provide a gray scale liquid crystal display apparatus that uniformly distributes intermediate transmission levels across a wide range of viewing angles without the requirement for multi-domain pixels.

Another object of this invention is to provide a color liquid crystal display apparatus suitable for use in group-viewed color video or multi-color computer display applications.

A further object of this invention is to provide an LCD that can be manufactured in accordance with a simple and relatively inexpensive manufacturing method.

A gray scale and color LCD cell made according to this invention combines a liquid crystal cell having an optically self-compensating symmetrical director field with a negative birefringence compensator plate and interposes them between a pair of polarizers. The symmetrical director field produces a symmetrical but non-uniform gray scale or color viewing circle curve from the liquid crystal cell. The negative birefringence plate restores the gray scale or color viewing angle uniformity. When graphed on a polar plot, the light transmission percentage curves characterizing the LCD are substantially concentric circles surrounding the optical axis for all azimuthal angles and viewing angles up to 30 degrees. Adding colored filters to a color cell triad provides a basis for a multi-color display having uniformly perceived colors over a wide range of azimuthal and viewing angles.

Additional objects and advantages of this invention will be apparent from the following detailed description of a preferred embodiment thereof which proceeds with reference to the accompanying drawings.

DETAILED DESCRIPTION OF PREFERRED EMBODIMENT

Figure 1:
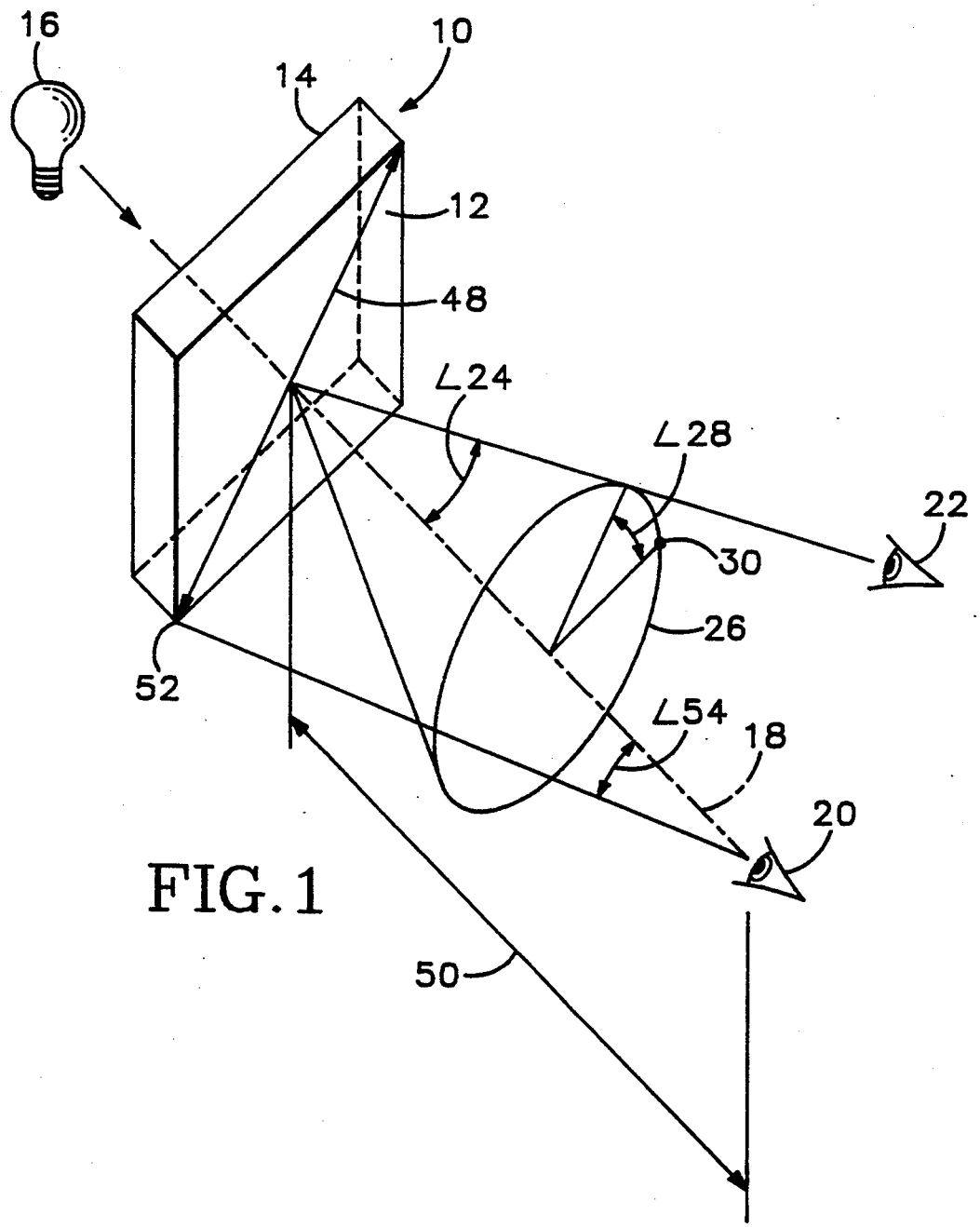
FIG. 1 is an isometric schematic pictorial view of an LCD showing geometric parameters including the viewing angle and viewing circle of the LCD.
Figure 2A:
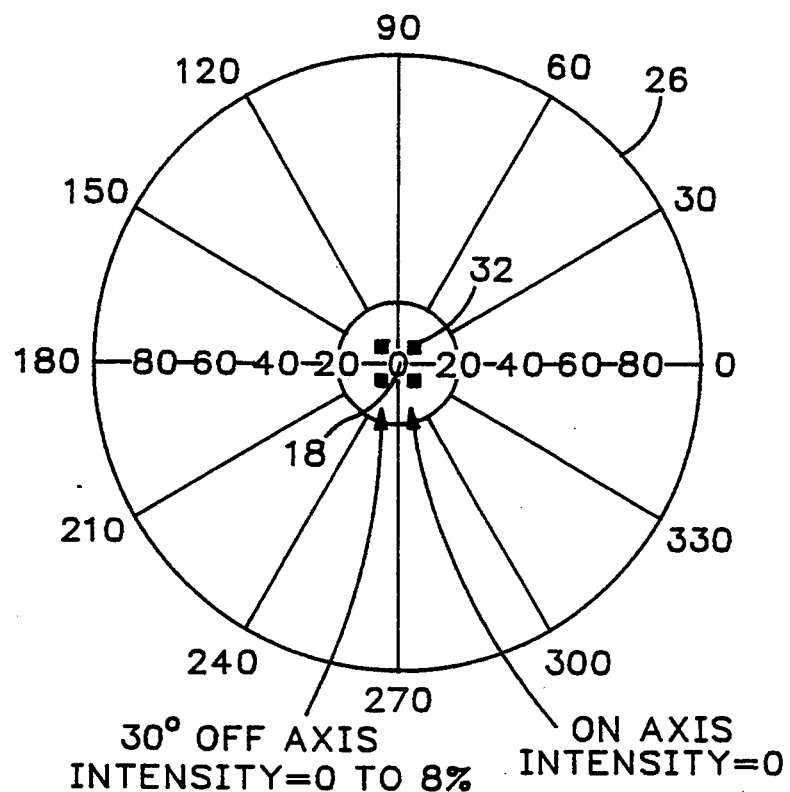
FIGS. 2A, 2B, and 2C are polar coordinate plots graphically showing on-axis and 30 degree off-axis light transmission levels around a viewing circle for respective 0, 36, and 100 percent on-axis light transmission levels through a prior art twisted nematic liquid crystal cell.
Figure 2B:
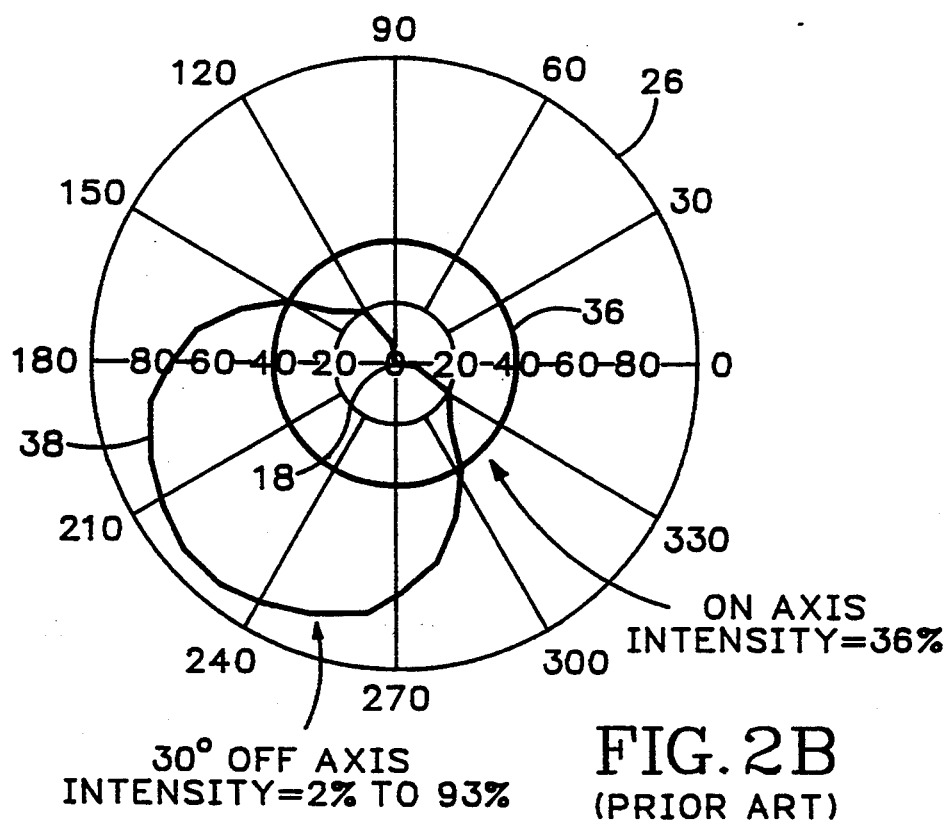
Figure 2C:
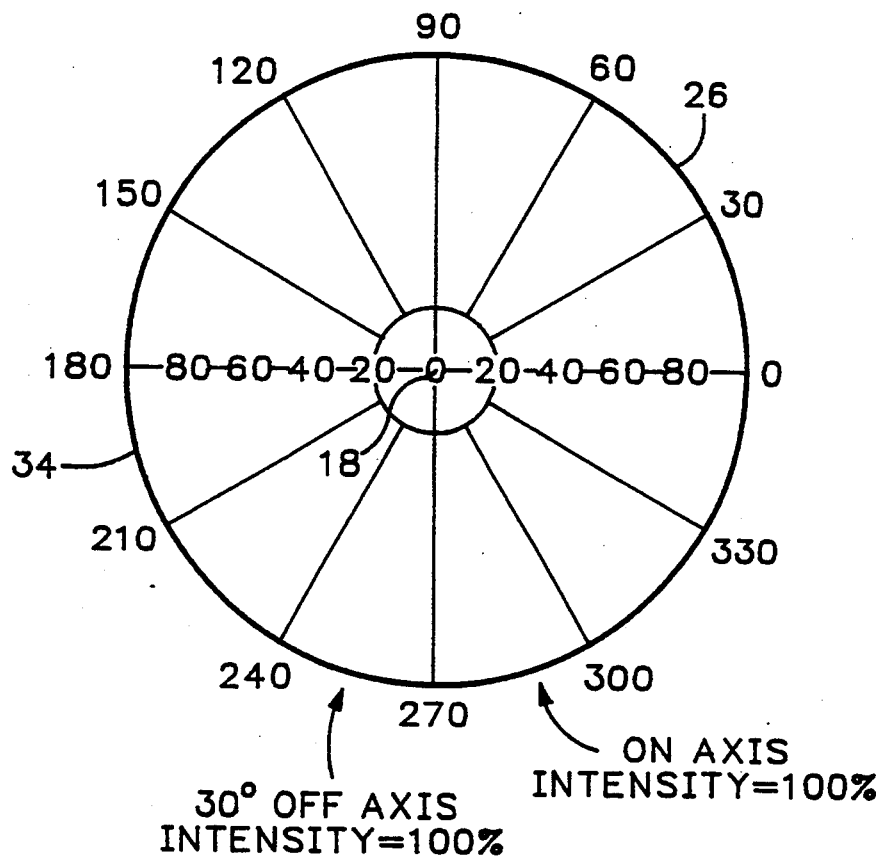
Figure 3:
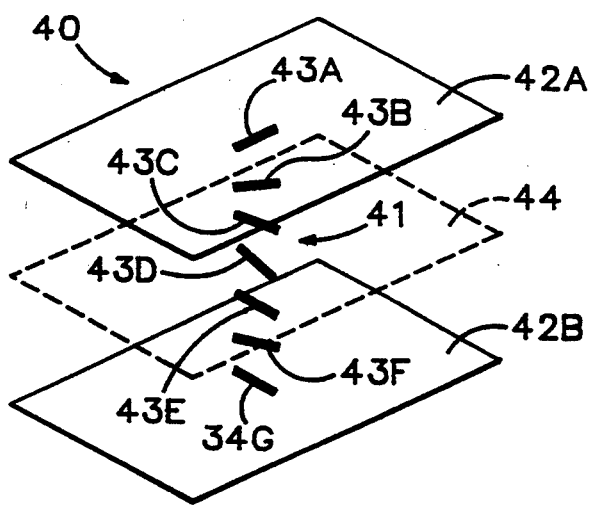
FIG. 3 is an isometric schematic pictorial view of a prior art twisted nematic liquid crystal cell showing an asymmetrical director field and an imaginary plane of symmetry.
Figure 4:
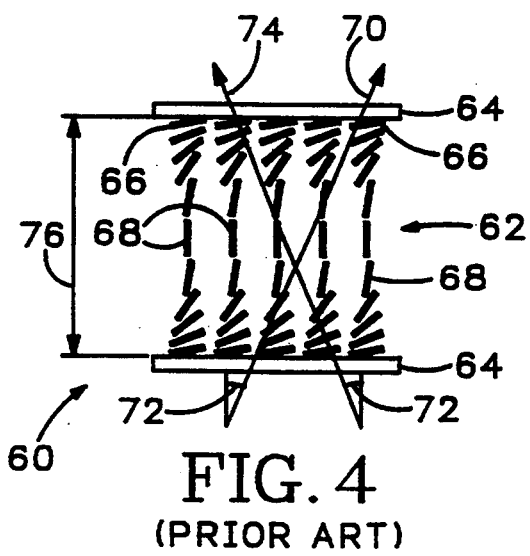
FIG. 4 is an enlarged cross-sectional view of a prior art tunable birefringence liquid crystal cell showing light rays traversing an asymmetrical director field.
Figure 5:
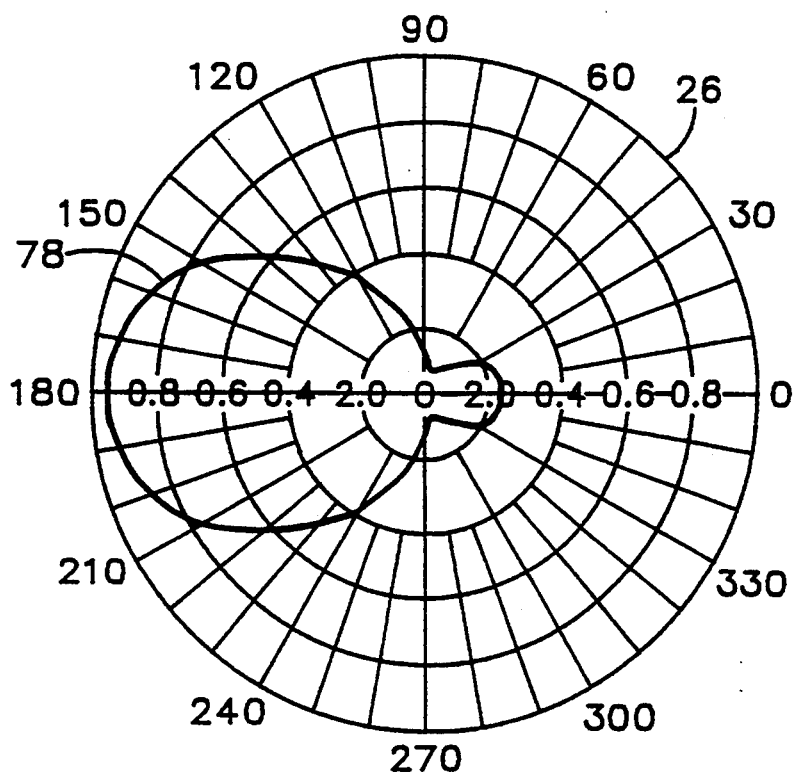
FIG. 5 is a polar coordinate plot graphically showing 30 degree off-axis light transmission levels around a viewing circle for a 50 percent on-axis light transmission level through the tunable birefringence cell of FIG. 4.
Figure 6A:
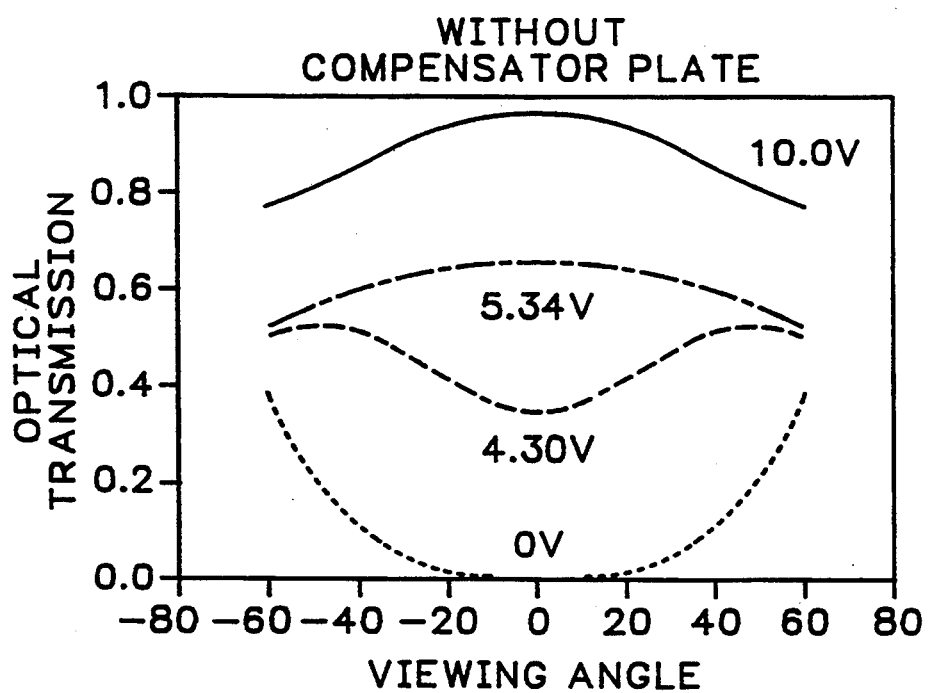
FIG. 6A graphically shows optical transmission variation as a function of viewing angle and various cell drive voltages for a prior art vertically aligned nematic liquid crystal cell.
Figure 6B:
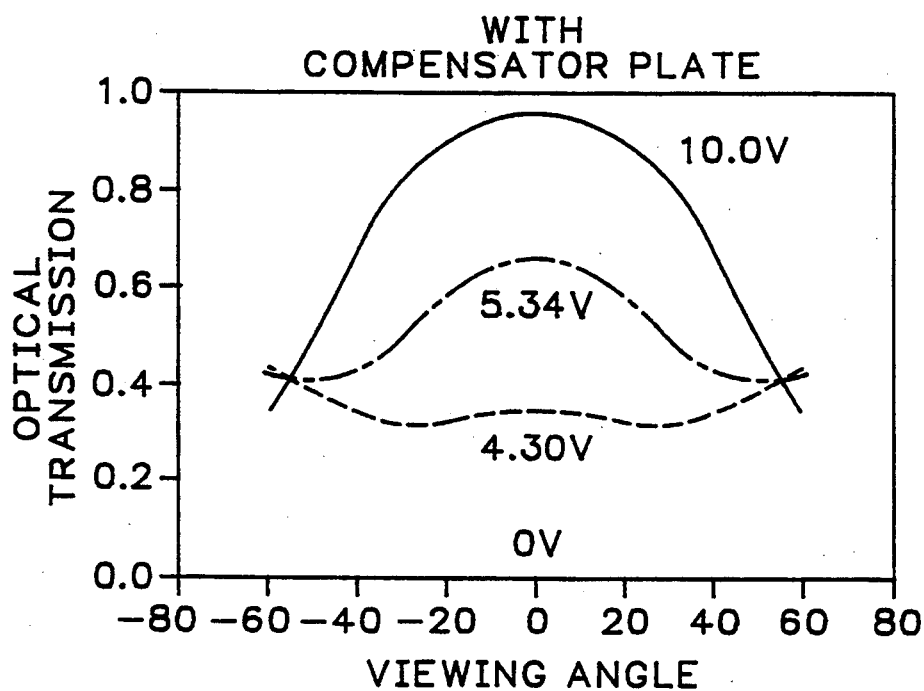
FIG. 6B graphically shows optical transmission variation as a function of viewing angle and various cell drive voltages for the prior art cell of FIG. 6A optically compensated by a negative birefringence plate.
Figure 9:
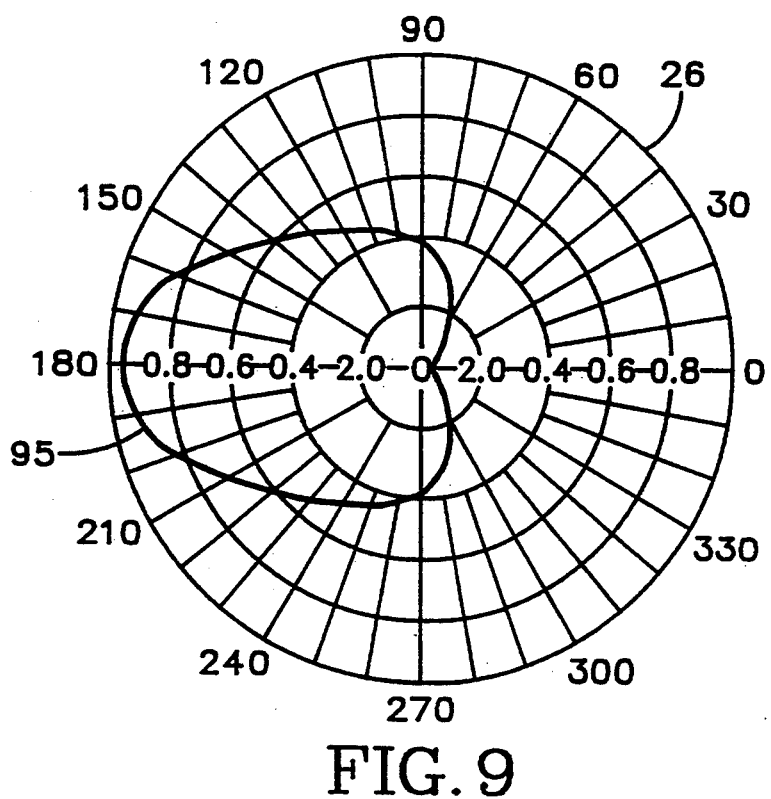
FIG. 9 is a polar coordinate plot graphically showing 30 degree off-axis light transmission levels around a viewing circle for a 50 percent on-axis light transmission level through the tunable birefringence cell of FIG. 4 optically compensated by a negative birefringence plate.

Applicant added a negative birefringence compensator plate to tunable birefringence cell 60 of FIG. 4 to assess the effectiveness of the combination. FIG. 9 shows the resulting light transmission variation curve 95 around viewing circle 26 for a 30 degree viewing angle and 50 percent on-axis transmission levels. Comparing FIGS. 5 and 9 reveals that the negative birefringence compensator plate does little to improve the shape of the light transmission curve and is, therefore, believed to have little usefulness in combination with such a cell.

Figure 8A:
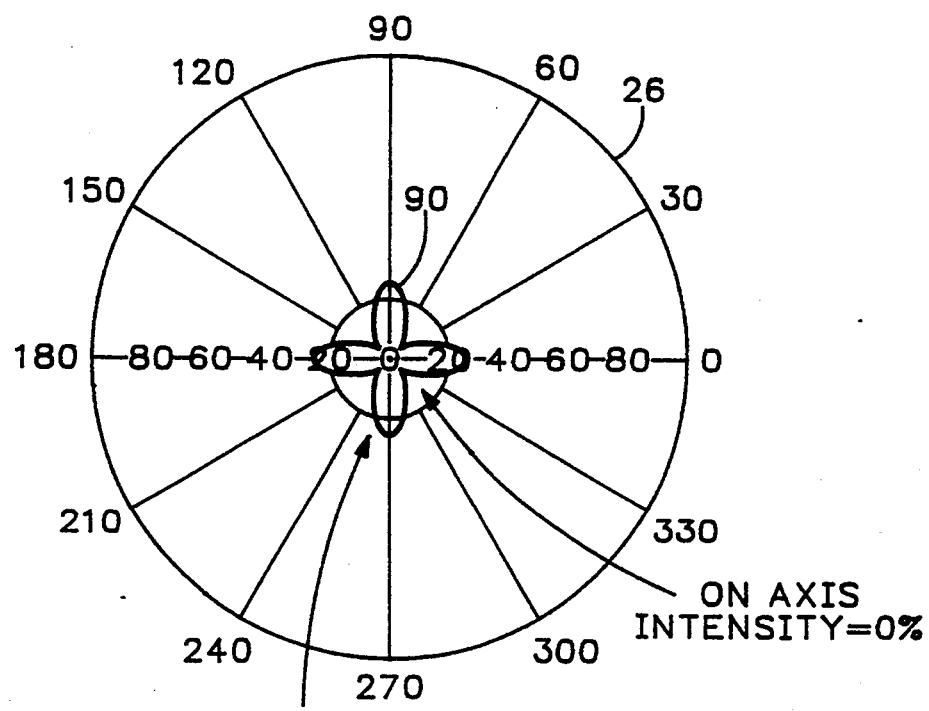
FIGS. 8A, 8B, and 8C are polar coordinate plots graphically showing on-axis and 30 degree off-axis light transmission levels around a viewing circle for respective 0, 50, and 100 percent on-axis light transmission levels through the tunable birefringence cell of FIG. 7.
Figure 8B:
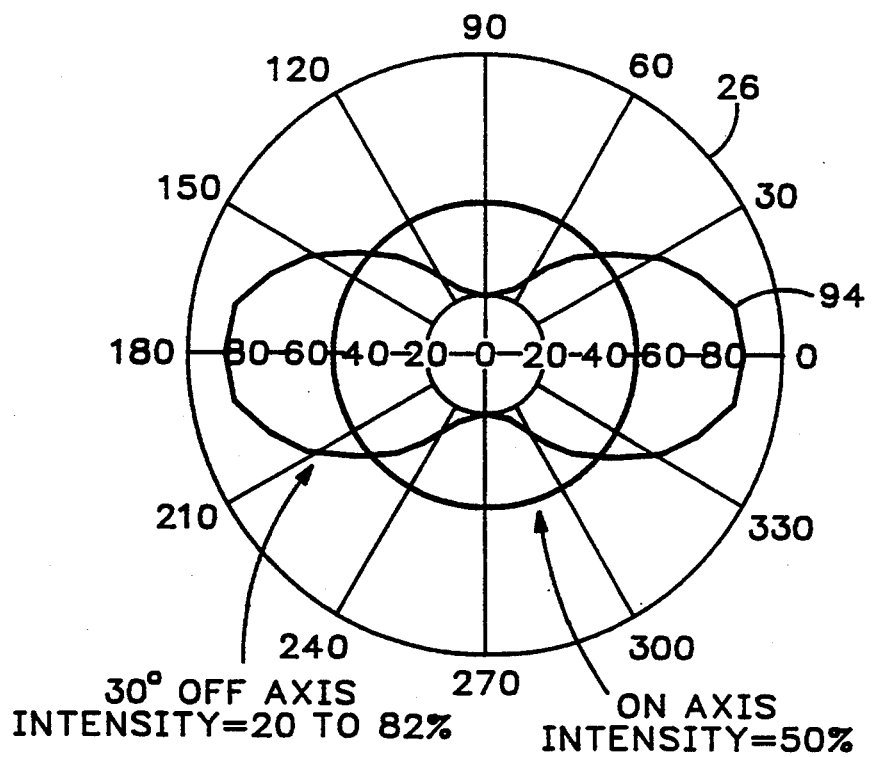
Figure 8C:
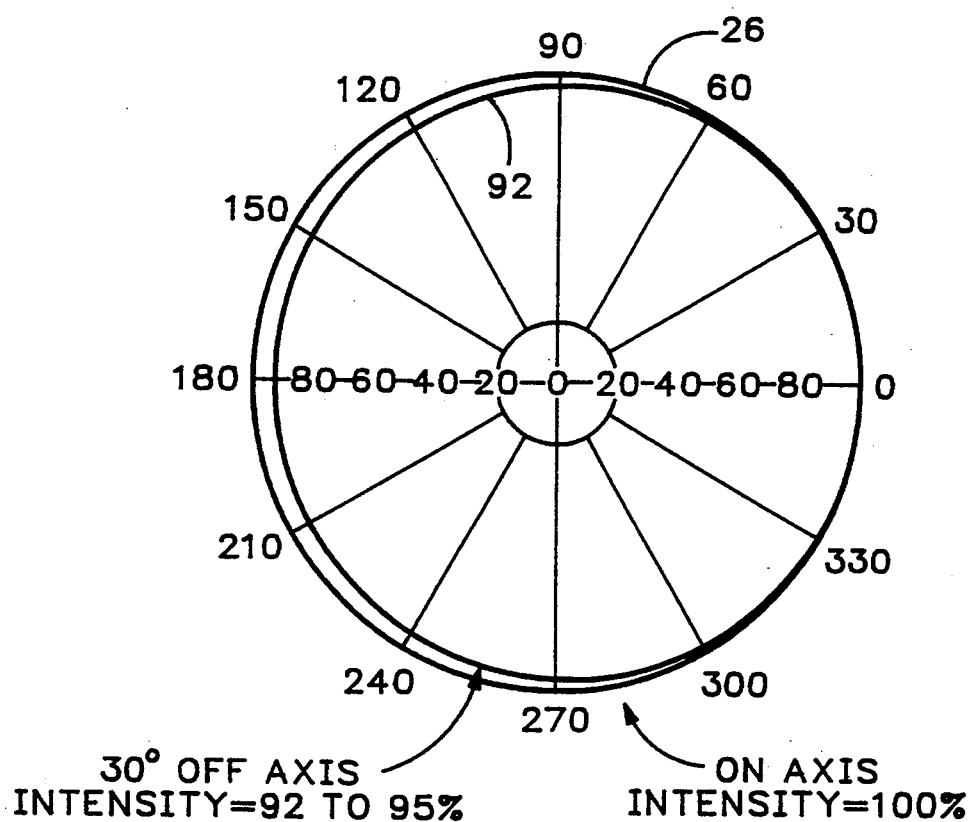

Bos and Koehler/Beran describe a tunable birefringence cell having a symmetrical director field for achieving a wide viewing angle for a fast switching bi-level LCD. Conventional wisdom dictates that a symmetrical director field cannot be used to achieve a wide viewing angle for a gray scale LCD. This belief is buttressed by FIG. 8B which shows the unacceptable gray scale viewing angle characteristics of tunable birefringent cell 80 with symmetrical director field 82 and 82'. However, combining cell 80 with a negative birefringence compensator plate provides an unexpected viewing angle improvement.

Figure 7:
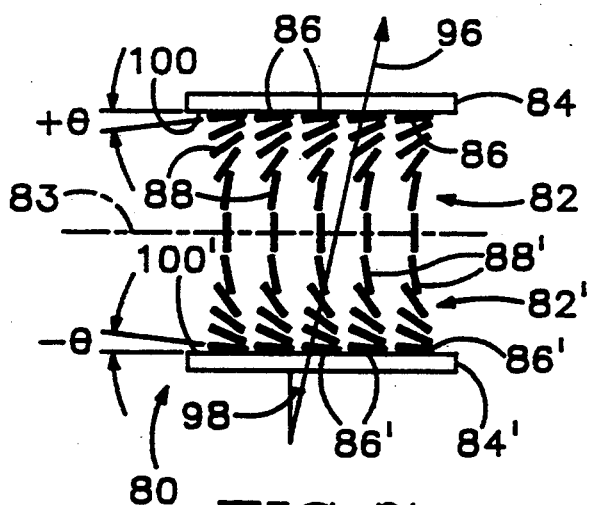
FIG. 7 is an enlarged cross-sectional view of a prior art tunable birefringence liquid crystal cell showing a light ray traversing a symmetrical director field.

Referring to FIGS. 10, 11A, 11B, and 11C, computer simulations and experiments confirm that combining a negative birefringence compensator plate 110 with a symmetrical LCD cell, such as cell 80 of FIG. 7, and disposing them between a parallel pair of crossed linear polarizers 112 and 114 produces an improved cell 116 having near ideal viewing circle curves 120, 122, and 124 for respective 1, 50, and 100 percent transmission levels.

LCD cell 80, compensator plate 110, and crossed linear polarizers 112 and 114 are each aligned perpendicular to an optical axis 130. LCD cell 80, compensator plate 110, and crossed linear polarizers 112 and 114 also have respective parallel planar reference axes 132, 134, 136, and 138. For symmetrical LCD cell 80, an arrow 140 indicates the alignment direction of surface contacting directors 86 and 86' (FIG. 7), which alignment direction is oriented perpendicular to planar reference axis 132. Compensator plate 110 has an axis of negative birefringence 142 that is perpendicular to plate 110 and coincident with optical axis 130. Crossed linear polarizers 112 and 114 have linear polarization axes 144 and 146 oriented respectively plus 45 degrees and minus 45 degrees relative to planar reference axes 138 and 136.

Cell device 116 is made by orienting its optical components as indicated above and bonding them together into a unitary assembly. Transparent electrodes 84 and 84' are driven by a conventional electronic control circuit 147 to cause various predetermined light transmission levels through LCD cell device 116.

A method of making negative birefringence compensator plate 110 (a uniaxial medium with negative optical anisotropy having an axis of symmetry perpendicular to its surface) is described in French Pat. No. 2 595 156. The method entails the following steps: (a) laminating a sheet of initially birefringent thermoplastic polymer film such as Dupont SURLYN ® between two glass plates; (b) placing the resulting composite laminate in a plastic bag; (c) evacuating and sealing the bag; (d) applying a uniform pressure of one atmosphere to the composite laminate; (e) heating the bag containing the composite laminate in a steam bath until the thermoplastic polymer reaches a temperature at which it changes from a vitreous to an isotropic state free of birefringence; (f) removing the bag from the steam bath, whereupon the thermoplastic polymer will cool and contract in a direction constrained by, and perpendicular to, the glass plates; and (g) removing the pressure after the polymer has cooled. The thermoplastic polymer regains its birefringent properties but with an axis of symmetry perpendicular to the direction of contraction. Suitable negative birefringence compensator plates are manufactured by Stanley Electric Co., Ltd., Tokyo, Japan.

Negative birefringence compensator plate 110 is preferably made to a thickness 148, the value of which is determined such that the product of thickness 148 and compensator plate 110 birefringence is 60 to 85 percent of the product of a cell gap distance 149 and birefringence of symmetrical cell 80.

Skilled workers will realize that the birefringence values of compensator plate 110 and symmetrical cell 80 are a function of the wavelength of light propagating through them. The preferred wavelength of 500 nanometers is the wavelength of green light near the center of the visible color spectrum. Other light wavelengths toward the blue and red ends of the visible spectrum are not ideally compensated and might display perceptible color shifts when transmitted through LCD cell device 116. Such color shifts are easily corrected by a color compensating light source, appropriately selected color filters, or conventional color data compensating means such as lookup tables associated with control circuit 147.

The optically self-compensating effect of a symmetrical director field is described with reference to FIG. 7. Director fields 82 and 82' include respective surface contacting directors 86 and 86' as well as respective bulk directors 88 and 88'. The degree of birefringence at any point in an LCD cell is a function of the angle formed between a light ray traversing the point in the cell and the directors adjacent to the point. Minimum birefringence occurs when the light ray is parallel to the adjacent directors, and maximum birefringence occurs when the light ray is perpendicular to the adjacent directors. The effective birefringence of the cell is a function of the average angle the light ray makes relative to all directors passed while traversing the cell.

For gray scale operation, transparent electrodes 84 and 84' receive applied electrical potentials that hold symmetrical director fields 82 and 82' in an electric field of sufficient strength to provide an intermediate light transmission level through cell 80. Light ray 96 traversing cell 80 at angle 98 has a minimal effective birefringence in director field 82 because the propagation direction of light ray 96 is somewhat parallel to a majority of directors 86 and 88 and has a greater effective birefringence in director field 82' because the propagation direction of light ray 96 is somewhat perpendicular to a majority of directors 86' and 88'. For light ray 96 traversing cell 80 at angle 98, the effective birefringence is decreased in the upper half (i.e., through director field 82) of cell 80 but is increased in the bottom half (i.e., through director field 82') of cell 80. The net effect is a reduced variation of effective birefringence on light ray 96 as angle 98 varies.

U.S. Pat. No. 4,853,825 issued Apr. 22, 1986 for an ELECTRO-OPTICAL DISPLAY SYSTEM WITH IMPROVED VIEWING ANGLE, and assigned to the assignee of this invention, describes how to make symmetrical director fields 82 and 82'. A surface film layer 100 on transparent electrode 84 is conditioned so that surface contacting directors 86 are aligned parallel to one another at a tilt angle +Θ, which is measured in the counterclockwise sense with reference to surface film layer 100. A surface film layer 100' on transparent electrode 84' is conditioned so that surface contacting directors 86' are aligned parallel to one another at a tilt angle −Θ, which is measured in the clockwise sense with reference to surface film layer 100'. Therefore, symmetrical LCD cell 80 is fabricated so that surface contacting directors 86 and 86' of the opposite surfaces of surface film layers 100 and 100' of transparent electrodes 84 and 84' are respectively tilted in equal but opposite directions. Bulk directors 88 and 88' align naturally with surface contacting directors 86 and 88' generally as shown schematically for symmetrical director fields 82 and 82'.

A first preferred method of effecting the desired alignment of surface contacting directors 86 and 86' entails the use of polyamide as the material which comprises surface film layers 100 and 100' on respective transparent electrodes 84 and 84'. Each surface film layer is rubbed to produce a tilt angle Θ, with 3 to 5 degrees being the preferred range.

A second preferred method for effecting the desired alignment of surface contacting directors 86 and 86' entails the use of silicon monoxide as the material that comprises surface film layers 100 and 100' of respective transparent electrodes 84 and 84'. The silicon monoxide layer is evaporated and vapor deposited preferably at a 5 degree angle measured from the electrode surface and in an amount sufficient to produce a tilt angle Θ of between 10 and 30 degrees, with 15 to 25 degrees being the preferred range.

Figure 10:
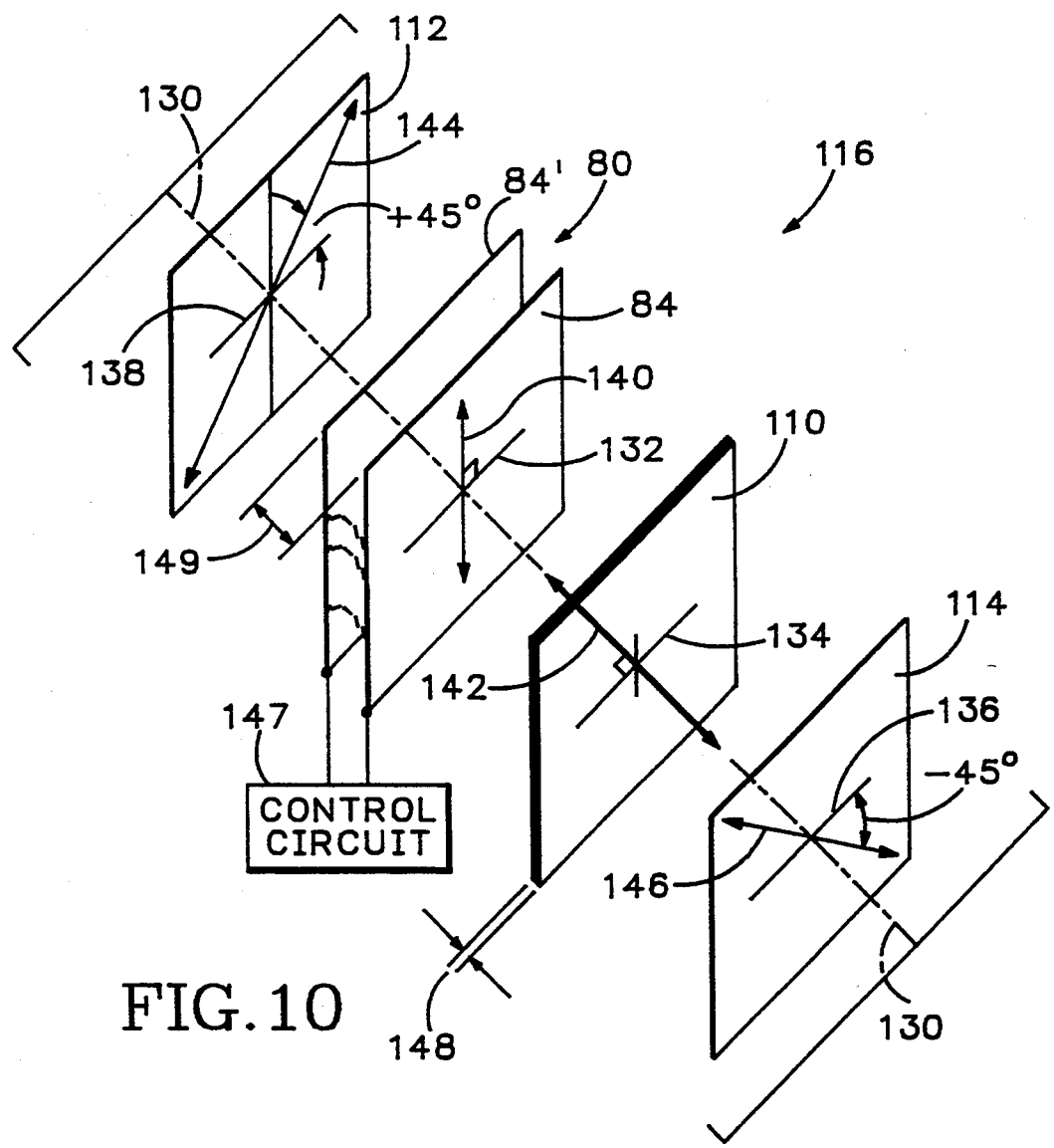
FIG. 10 is an exploded isometric view of a gray scale LCD cell according to this invention showing the relative arrangement along an optical axis of the liquid crystal cell having a symmetrical director field, negative birefringence compensator plate, and crossed linear polarizers.
Figure 11A:
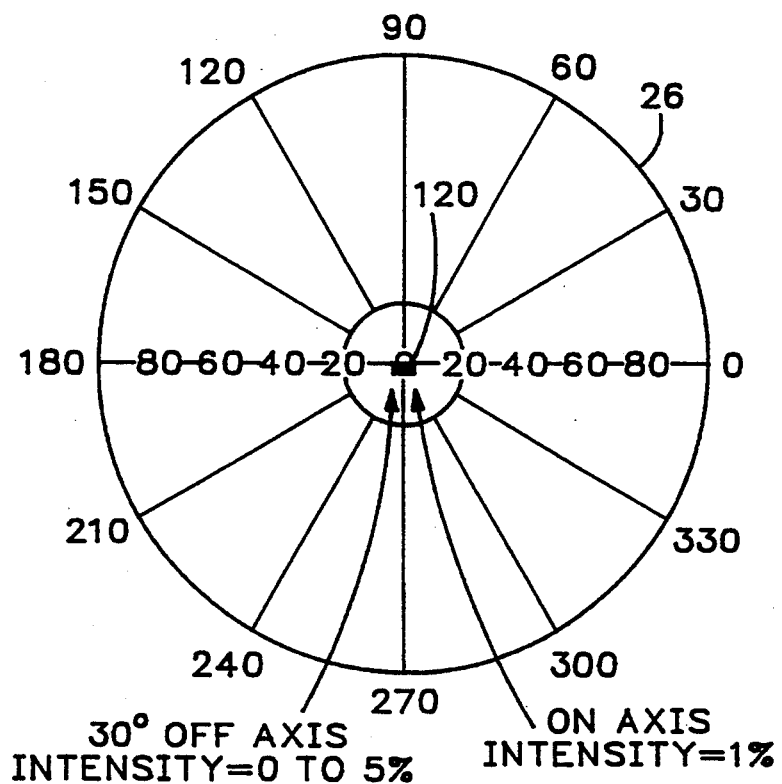
FIGS. 11A, 11B, and 11C are polar coordinate plots graphically showing on-axis and 30 degree off-axis light transmission levels around a viewing circle for respective 0, 50, and 100 percent on-axis light transmission levels through the liquid crystal cell of FIG. 10.
Figure 11B:
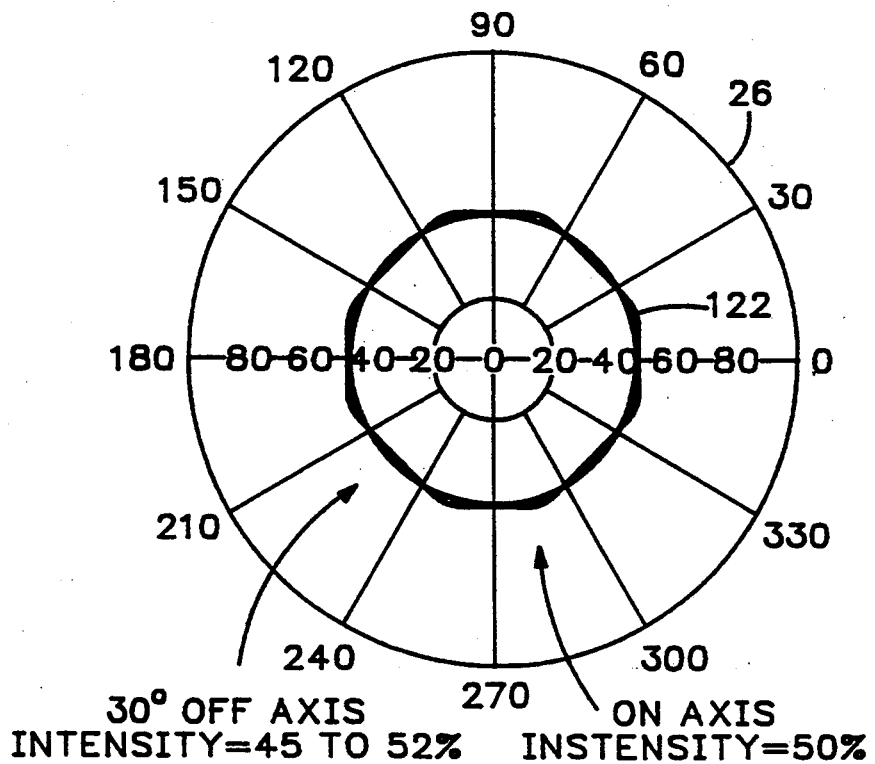
Figure 11C:
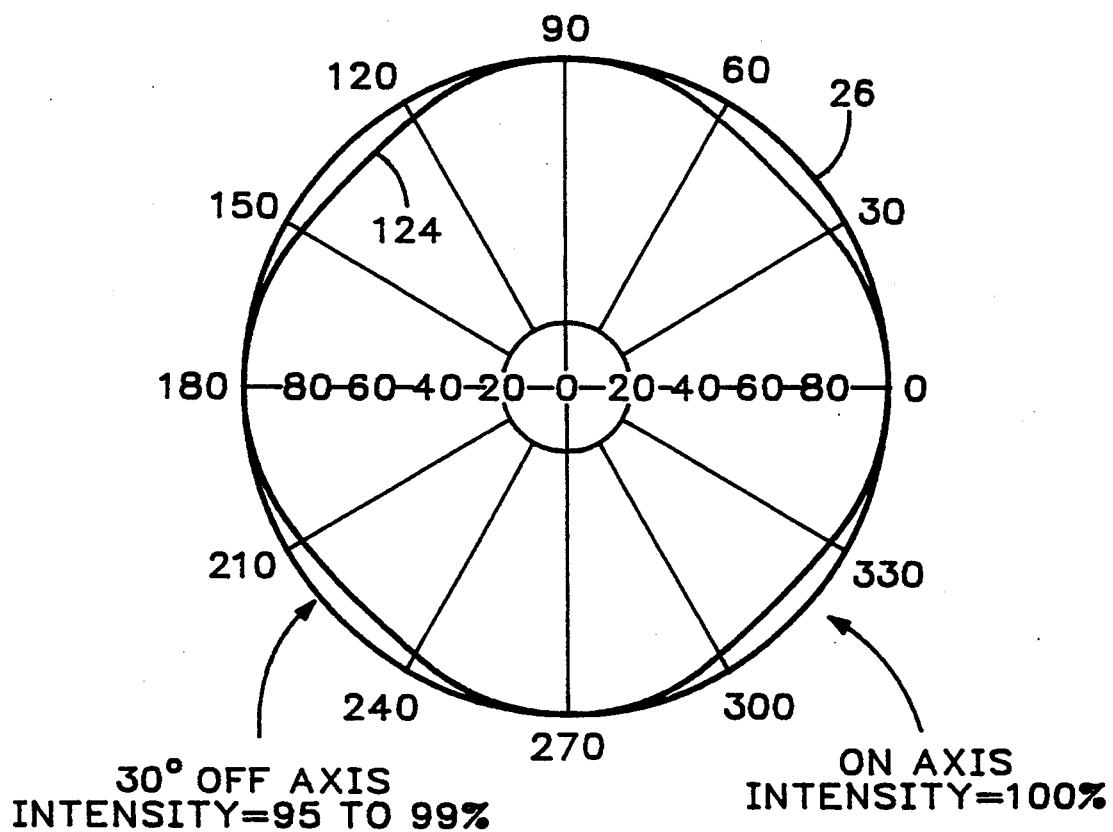

Referring to FIG. 10, gap distance 149 of symmetrical cell 80 is preferably made such that the product of cell gap distance 149 and cell 80 birefringence is at least 0.75. To ensure consistent results, the same cell thickness and liquid crystal material were used for data collection in connection with FIGS. 5, 8, 9, and 11.

Gray scale LCD cell device 116 provides nearly perfect viewing angle characteristics for all gray levels and colors, up to at least 30 degrees from optical axis 130 at any azimuthal viewing angle. Moreover, LCD cell device 116 does not require multi-domain pixels and is, therefore, relatively simple to manufacture.

Alternative embodiments of portions of the invention include, for example, its use of combinations of passive or active addressing and analog or digital control circuits. Moreover, LCD cell device 116 is useful in various display variations and combinations including single or multiple cell, reflective or transmissive, color or monochrome, and hand-held or large-screen.

Figures 12A, 12B, 12C:
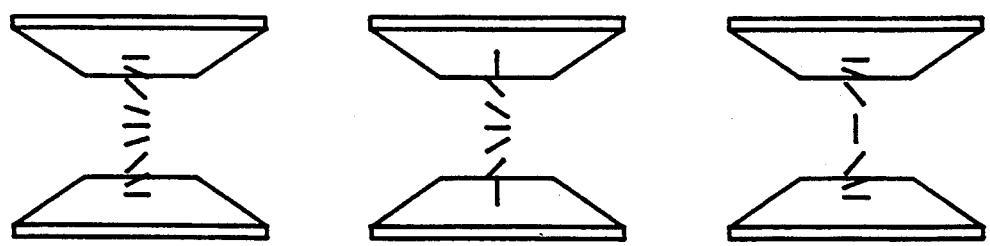
FIGS. 12A, 12B, and 12C show alternative embodiments of symmetrical director field configurations suitable for use with this invention.

Skilled workers will realize that symmetrical cell 80 is not limited to a tunable birefringence type and polarizers 112 and 114 need not be linear, crossed, or even be present in combination with some types of symmetrical cells. Likewise, various symmetrical director field configurations are possible such as those shown in FIGS. 12A, 12B, and 12C.

Figure 13:
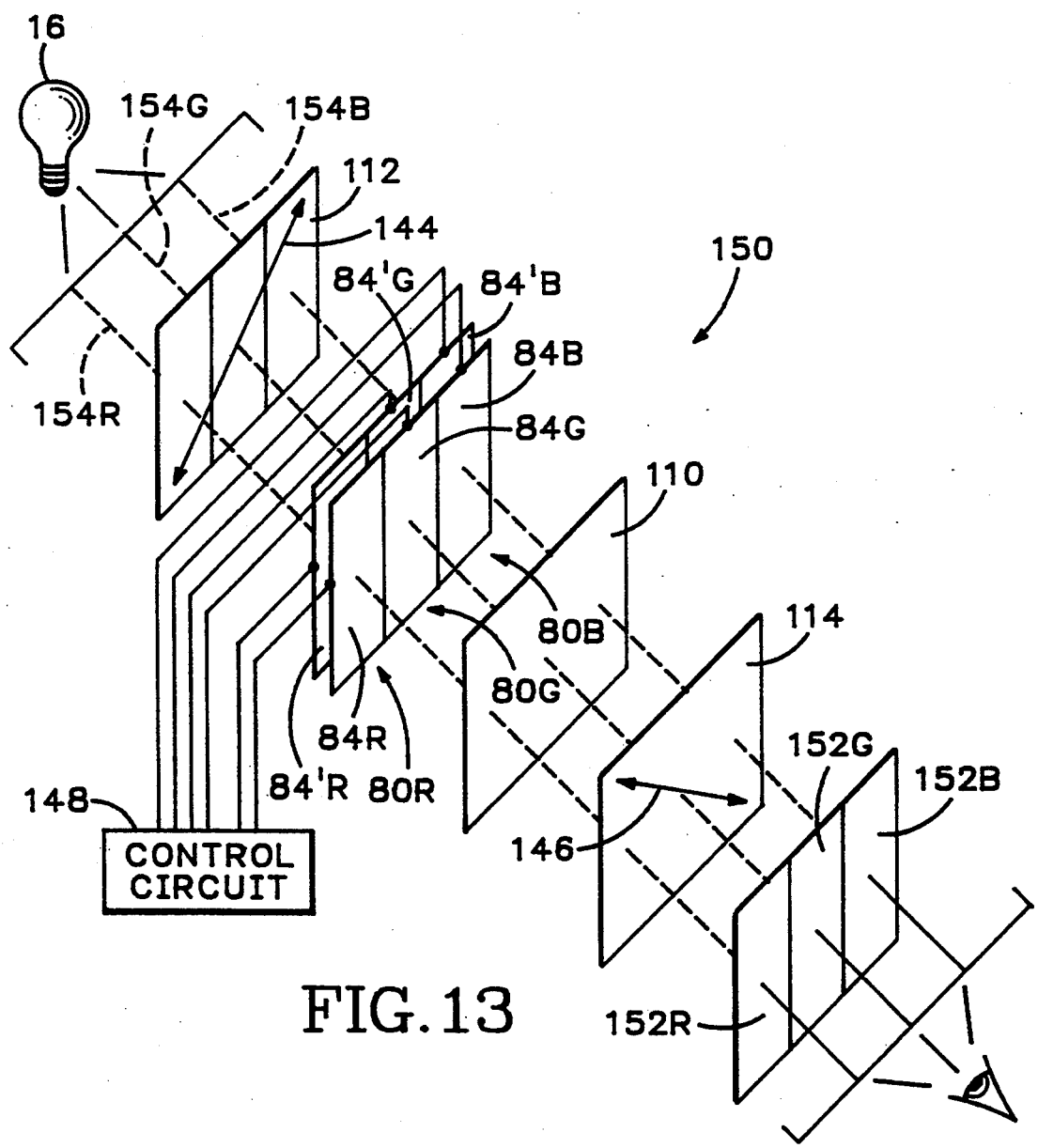
FIG. 13 is an exploded isometric view of a color LCD cell triad according to this invention showing the relative arrangement the cell triad components along three color optical axes in which each cell has a symmetrical director field and an associated color filter.

This invention is particularly suitable for use in flat-screen color video display applications. FIG. 13 shows one embodiment of a color cell triad 150 according to this invention. (Multiple identical elements associated with a particular color are hereafter identified with a common element number followed by a color identifying suffix, i.e., R=red, G=green, and B=blue.) Color cell triad 150 is based on LCD cell device 116 but further includes symmetrical LCD cells 80R, 80G, 80B, and a set of associated color filters 152R, 152G, 152B.

Color cell triad 150 receives from light source 16 white light that propagates along light paths 154R, 154G, and 154B, through linear polarizer 112 to symmetrical LCD cells 80R, 80G, and 80B. Control circuit 147 separately drives transparent electrode pairs 84R/84'R 84G/84'G and 84B/84'B to control the effective birefringence of respective cells 80R, 80G, and 80B. Linear polarized white light is changed to an amount of elliptical polarization determined by the effective birefringence of cells 80R, 80G, and 80B. The elliptically polarized white light leaving cells 80R, 80G, and 80B along light paths 154R, 154G, and 154B is restored to linear polarization by negative birefringence compensator plate 110. The white light angle of polarization relative to polarization axis 144 of linear polarizer 112 is a function of the degree of elliptical polarization applied to the white light by cells 80R, 80G, and 80B. The linear polarized white light propagating along light paths 154R, 154G, and 154B reaches linear polarizer 114 at a polarization angle relative to its linear polarization axis 146. The amount of white light passed by linear polarizer 114 along each of light paths 154R, 154G, and 154B is proportional to the match between their respective polarization angles and linear polarization axis 146.

A predetermined amount of white light is thereby allowed to transmit along each of light paths 154R, 154G, and 154B through respective color filters 152R, 152G, and 152B which are shown for clarity outside of polarizers 112 and 114. An observer viewing color cell triad 150 perceives any of various predetermined colors depending on the amount of light transmitted along each of light paths 154R, 154G, and 154B.

A preferred embodiment for color filters 152R, 152G, and 152B integrates them with indium tin oxide layers forming transparent electrodes 84R, 84G, and 84B of symmetrical cell 80. The preferred embodiment is simpler to manufacture and prevents a possibility of color parallax at wide viewing angles.

Skilled workers will realize that thousands of color cell triad 150 are typically needed to implement a color LCD, while only a single light source, negative birefringence compensator plate 110, and pair of crossed linear polarizers 112 and 144 are required. Likewise, color filters 152R, 152G, and 152B may be applied separately to each light path, or as color filter stripes that are aligned with rows or columns of light paths associated with a common color. The optical axis of such a color LCD is typically parallel to light paths 154 and centered on the display screen area made by the multiple color cell triads 150.

Many changes may be made to the details of the above-described embodiments of this invention without departing from the underlying principles thereof. Accordingly, it will be appreciated that this invention is also applicable to image display applications other than those found in computers and television receivers. The scope of the present invention should be determined, therefore, only by the following claims.

I claim:

1. A gray scale liquid crystal display apparatus having an optical axis and light transmission properties specified by a range of off-axis and azimuthal viewing angles, comprising:

a liquid crystal cell including a liquid crystal material enclosed between a pair of optically transparent electrodes, the liquid crystal material having directors arranged in a controllable, optically self-compensating symmetrical director field configuration;

a negative birefringence compensator plate optically associated with the liquid crystal cell; and a control circuit for applying to the transparent electrodes an electric field of at least three selectable field strengths that reorient the symmetrical director field configuration and thereby control transmission of respective predetermined levels of externally generated light exiting the liquid crystal display apparatus, the symmetrical director field configuration and the negative birefringence compensator plate cooperating to provide for each of the predetermined levels generally uniform amounts of light transmission for off-axis and azimuthal viewing angles within a wide range of viewing and azimuthal angles relative to the optical axis.

2. The apparatus of claim 1 in which the liquid crystal cell and the compensator plate are disposed between a parallel pair of linear polarizers having substantially perpendicular polarization axes.

3. The apparatus of claim 2 in which the symmetrical director field includes surface contacting directors having an alignment direction disposed at an angle that substantially bisects an angle formed by the polarization axes of the linear polarizers.

4. The apparatus of claim 1 in which a light source produces the externally generated light and the liquid crystal display apparatus is of a light transmissive type.

5. The apparatus of claim 1 in which the negative birefringence compensator plate is of a thickness optimized for light having a wavelength of about 500 nanometers.

6. The apparatus of claim 1 in which the negative birefringence compensator plate includes an axis of negative birefringence that is substantially parallel to the optical axis.

7. The apparatus of claim 1 in which the viewing angles include off-axis angles of 0 to about 30 degrees from the optical axis.

8. The apparatus of claim 1 in which the viewing angles include azimuthal angles of 0 to 360 degrees encircling the optical axis.

9. The apparatus of claim 1 in which one of the predetermined light transmission levels includes an intermediate light transmission level in the range of from 25 percent to 75 percent of a maximum light transmission level available from a light source.

10. The apparatus of claim 1 in which each of the pair of optically transparent electrodes has an inner surface that includes a director alignment layer conditioned so that the directors of the liquid crystal material in contact therewith become substantially uniformly aligned to form tilt angles with the conditioned surface, the tilt angles of the directors in contact with the conditioned surface of one optically transparent electrode being defined in a rotational sense opposite to that of the tilt angles of the directors in contact with the conditioned surface of the other optically transparent electrode.

11. The apparatus of claim 10 in which the inner surfaces of the optically transparent electrodes are separated by a cell gap distance and the liquid crystal material has a birefringence, the product of the cell gap distance and the birefringence being about or greater than 0.75.

12. The apparatus of claim 10 in which the tilt angles have an absolute value of between about three and five degrees.

13. The apparatus of claim 1 in which the optically self-compensating symmetrical director field configuration includes a pair of director fields symmetrically disposed about a cell centerline located midway between the optically transparent electrodes, the directors of the liquid crystal material located along the cell centerline being oriented generally normal to the optically transparent electrodes for each predetermined level of externally generated light exiting the liquid crystal apparatus.

14. The apparatus of claim 1 in which the optically transparent electrodes are separated by a cell gap distance and the liquid crystal material has a birefringence, the product of the cell gap distance and birefringence being about or greater than 0.75.

* * * * *